F. W. MOSELEY.
Bottom for Sheet-Metal Vessel.
No. 212,484. Patented Feb. 18, 1879.
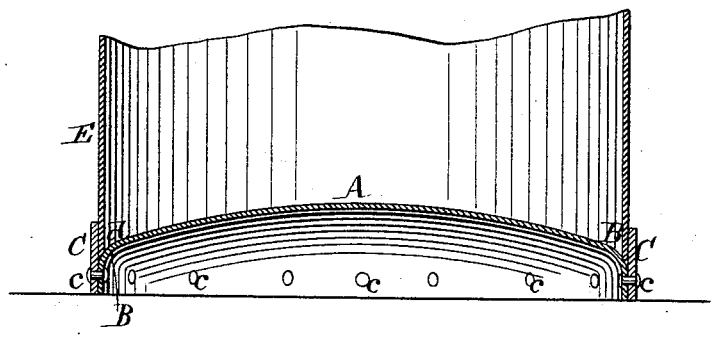
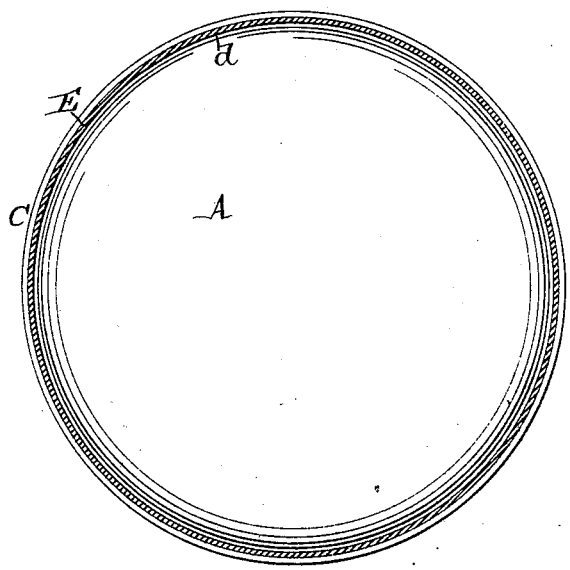
Witnesses.
Chas Wahlers.
F. C. Hauff.
Inventor.
F. W. Moseley
by his attys.
Van Santvoord & Hauff

UNITED STATES PATENT OFFICE.

FREDRICK W. MOSELEY, OF POULTNEY, VERMONT, ASSIGNOR TO HIMSELF AND MARVIN O. STODDARD, OF SAME PLACE.

IMPROVEMENT IN BOTTOMS FOR SHEET-METAL VESSELS.

Specification forming part of Letters Patent No. 212,484, dated February 18, 1879; application filed December 19, 1878.

*To all whom it may concern:*

Be it known that I, FREDRICK W. MOSELEY, of Poultney, in the county of Rutland and State of Vermont, have invented a new and useful Improvement in Bottoms for Sheet-Metal Vessels, which improvement is fully set forth in the following specification, reference being had to the accompanying drawings, in which—

Figure 1 represents a cross-section of a bottom embracing my invention. Fig. 2 is a plan or top view thereof.

Similar letters indicate corresponding parts.

My invention relates to bottoms for milk-cans and other sheet-metal vessels, its object being to produce a cheap and strong bottom, and one capable of being firmly united with the body of a vessel with little labor.

It consists in a sheet-metal bottom having a circumferential curved flange, in combination with a straight vertical rim, which is riveted or otherwise secured to said flange, and projects above its junction therewith, so that the flange is re-enforced by said rim, and a substantial rest or support is formed on the bottom, while at the same time a recess is formed at the junction of the straight rim with the curved flange, adapted to receive the lower edge of the body of a can or vessel, so that a firm joint can be produced between the bottom and such body by means of solder.

In the drawings, the letter A designates a sheet-metal bottom, having a circumferential curved, flange B; and C is a straight vertical rim secured to said flange according to my invention.

In the example shown the bottom A has a concavo-convex form; but the same can, if desired, be made flat. The curvature of the flange B terminates at the junction of the rim C with said flange, or, in other words, at the rivets c, by which the rim and flange are fastened together; and the rim C is made of suitable width to project above the junction of the same with the flange B, as shown in Fig. 1. I usually secure the rim C to the flange B by means of rivets; but other means may be employed for this purpose.

The rim C has the effect of re-enforcing the flange B, and thereby forming on the bottom a substantial support; and by the arrangement of the rim C relatively to the curvature of the flange a recess, d, is formed at or above the junction of the rim with the flange. By fitting the lower edge of the body E of a vessel into this recess and soldering the same therein, a firm and tight joint is produced between the bottom and the body, this joint being capable of improvement by soldering the body also to the upper edge of the rim.

What I claim as new, and desire to secure by Letters Patent, is—

The combination, with the bottom A, having a circumferential flange, B, of the hoop or rim C, surrounding said flange and riveted thereto, projecting above said bottom, and the body E, fitting within said upward-projecting portion, the connected rim and flange forming the support of the said body, substantially as described.

In testimony that I claim the foregoing I have hereunto set my hand and seal this 9th day of December, 1878.

FREDRICK W. MOSELEY. [L. S.]

Witnesses:
FRED. S. PLATT,
CYRUS L. GATES.